C. STEENSTRUP.
ELASTIC FLUID TURBINE.
APPLICATION FILED SEPT. 20, 1919.

1,378,493.

Patented May 17, 1921.

Inventor:
Christian Steenstrup,
by
His Attorney

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

ELASTIC-FLUID TURBINE.

1,378,493.   Specification of Letters Patent.   Patented May 17, 1921.

Application filed September 20, 1919. Serial No. 325,197.

*To all whom it may concern:*

Be it known that I, CHRISTIAN STEENSTRUP, a citizen of the United States, residing at Schenectady, in the county of Schenectady, State of New York, have invented certain new and useful Improvements in Elastic-Fluid Turbines, of which the following is a specification.

The present invention relates to elastic fluid turbines and has for its object to provide an improved arrangement for fastening turbine blades to the wheel, rotor or blade carrying member.

For a consideration of what I believe to be novel and my invention, attention is directed to the accompanying description and the claims appended thereto.

Figure 1:
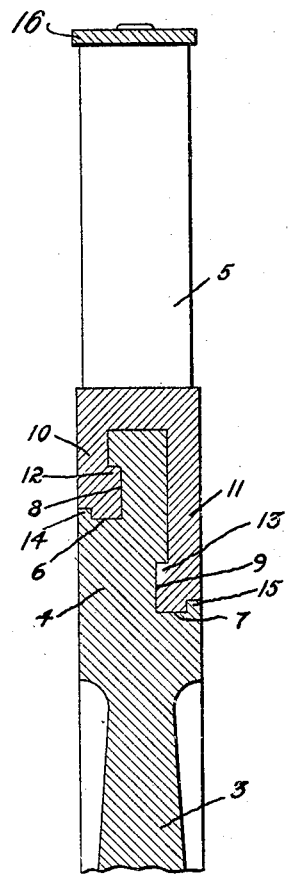
Figure 2:
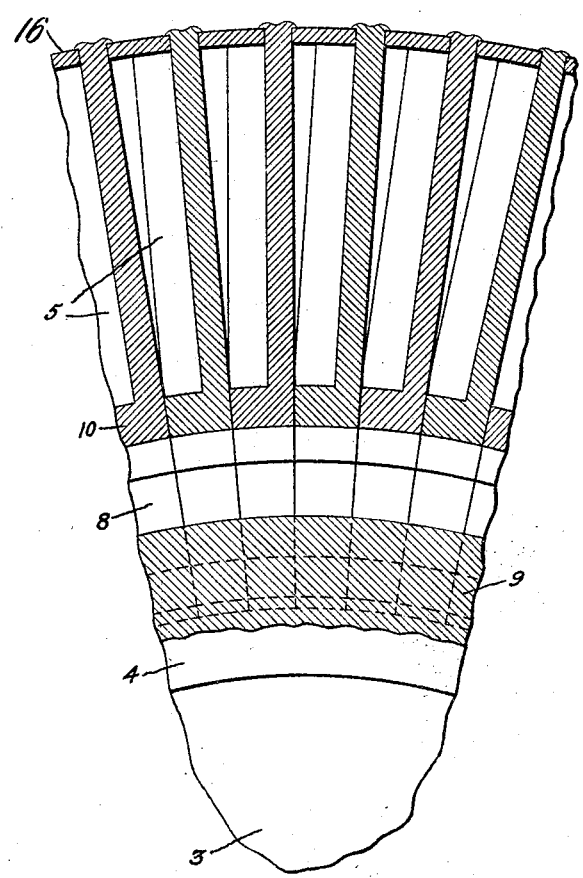

In the drawing, Figure 1 is a radial sectional view through the outer portion of a turbine wheel embodying my invention, and Fig. 2 is a side view partly in section of a part of a wheel as shown in Fig. 1.

The invention relates more particularly to a bucket fastening means of the so-termed inverted dovetail type, wherein the rim of the wheel or rotor is provided with annular grooves on opposite sides and the bucket bases are provided with central circumferentially extending slots which form two furcations or legs which straddle the wheel rim and have inwardly facing projections fitting into said annular grooves to hold the buckets against contrifugal force. Interleaving shoulders are also usually provided to prevent the bucket base legs from spreading.

According to my invention I arrange the annular grooves on the opposite sides of the wheel rim at different radial distances from the center of the wheel so they are not directly opposite each other, and I then construct the bucket bases so one leg or furcation is longer than the other and provide them with projections to fit into said grooves. By this arrangement the rim of the wheel is left comparatively thick throughout its radial depth since the two annular grooves do not come opposite each other thereby enabling a thinner rim to be used initially.

Referring to the drawing, 3 indicates the web of the wheel or rotor and 4 the rim thereof upon which the ring of buckets 5 is mounted. On opposite sides, the rim 4 is provided with annular shoulders 6 and 7 and annular grooves 8 and 9, grooves 8 being nearer the periphery of the wheel than groove 9, so the two grooves are not directly opposite each other. The bucket bases are provided with slots forming two legs or furcations 10 and 11 which straddle rim 4. Legs 11 are longer than legs 10 as shown, the legs 10 reaching down to shoulders 6 and the legs 11 to shoulders 7. On legs 10 and 11 are inwardly facing projections 12 and 13 which fit into grooves 8 and 9. Shoulders 6 and 7 are provided with annular projections 14 and 15 behind which the extremities of legs 10 and 11 are located to prevent them from spreading. The bucket cover is indicated at 16.

The buckets will be assembled on the wheel in the usual manner, one or more filling slots (not shown) being provided in the rim as is well understood.

With the above described arrangement it will be seen that the two annular grooves 8 and 9 are not opposite each other and hence a greater width of material is left in the wheel rim at its thinnest point than would be the case were they opposite each other. This results in a strong wheel and in economy of material.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a turbine, a rotor having a rim provided with grooves on opposite sides thereof, the groove on one side being located at a greater radial distance from the periphery of the rotor than that on the other side, and buckets having legs of unequal length which straddle said rim and are provided with projections fitting in said grooves.

2. In a turbine, a rotor having a rim provided with grooves on opposite sides thereof, the groove on one side being located at a greater radial distance from the periphery of the rotor than that on the other side, buckets having legs of unequal length which straddle said rim and are provided with projections fitting in said grooves, and projections on said rim which engage the outer surfaces of said legs to prevent them from spreading.

In witness whereof, I have hereunto set my hand this 19th day of September, 1919.

CHRISTIAN STEENSTRUP.